(12) United States Patent
Yang et al.

(10) Patent No.: US 11,789,500 B2
(45) Date of Patent: Oct. 17, 2023

(54) SINGLE-AXIS HINGE

(71) Applicant: Sinher Technology Inc., New Taipei (TW)

(72) Inventors: Shih-Pin Yang, New Taipei (TW); Jien-Yao Peng, New Taipei (TW)

(73) Assignee: SINHER TECHNOLOGY INC., New Taipei (TW)

( * ) Notice: Subject to any disclaimer, the term of this patent is extended or adjusted under 35 U.S.C. 154(b) by 36 days.

(21) Appl. No.: 17/736,674

(22) Filed: May 4, 2022

(65) Prior Publication Data
US 2022/0365572 A1 Nov. 17, 2022

(30) Foreign Application Priority Data

May 11, 2021 (TW) ................................ 110205282

(51) Int. Cl.
| | |
|---|---|
| *G06F 1/16* | (2006.01) |
| *E05D 3/04* | (2006.01) |
| *E05D 11/06* | (2006.01) |
| *E05D 5/06* | (2006.01) |

(52) U.S. Cl.
CPC .............. *G06F 1/1681* (2013.01); *E05D 3/04* (2013.01); *E05D 5/06* (2013.01); *E05D 11/06* (2013.01); *E05Y 2800/10* (2013.01); *E05Y 2900/606* (2013.01)

(58) Field of Classification Search
CPC ........... G06F 1/1681; E05D 3/04; E05D 5/06; E05D 11/06; E05Y 2900/606
See application file for complete search history.

(56) References Cited

U.S. PATENT DOCUMENTS

| | | | | |
|---|---|---|---|---|
| 7,414,834 B2* | 8/2008 | Ukonaho | ............... | G06F 1/1681 |
| | | | | 361/679.55 |
| 8,020,255 B2* | 9/2011 | Shen | ..................... | G06F 1/1616 |
| | | | | 16/337 |
| 8,474,101 B2* | 7/2013 | Wang | .................... | G06F 1/1681 |
| | | | | 16/354 |
| 8,578,561 B2* | 11/2013 | Chuang | ................. | G06F 1/1681 |
| | | | | 16/354 |
| 9,182,790 B2* | 11/2015 | Lee | ........................ | G06F 1/1616 |
| 9,388,617 B2* | 7/2016 | Onda | .................... | E05D 11/082 |
| 9,617,770 B1* | 4/2017 | Lin | ........................ | E05D 11/082 |
| 10,635,140 B1* | 4/2020 | McKittrick | .......... | H05K 5/0226 |
| 2010/0149764 A1* | 6/2010 | Ueyama | ................ | G06F 1/1683 |
| | | | | 220/4.23 |

(Continued)

*Primary Examiner* — Jason W San
(74) *Attorney, Agent, or Firm* — Muncy, Geissler, Olds & Lowe, P.C.

(57) ABSTRACT

A single-axis hinge includes a base, a movable plate, a limiting block, a rotating shaft and a stand set. The base includes a first shaft mounting hole, a stand drive shaft mounting hole and a path. The movable plate is formed with a second shaft mounting hole and a limiting notch. The limiting block is installed in the path. The rotating shaft passes through the first and second shaft mounting holes and includes a driving block and a first cam. An edge of the driving block is formed with a transmission teeth portion not completely surround the edge. The stand set includes a stand drive shaft disposed in the stand drive shaft mounting hole, and a support stand driven by the stand drive shaft. The stand drive shaft includes a gear and a second cam formed with a positioning notch.

9 Claims, 8 Drawing Sheets

(56) References Cited

U.S. PATENT DOCUMENTS

| | | | | |
|---|---|---|---|---|
| 2010/0236023 | A1* | 9/2010 | Wang | F16M 11/10 16/342 |
| 2011/0157780 | A1* | 6/2011 | Wang | G06F 1/1681 361/679.01 |
| 2011/0271486 | A1* | 11/2011 | Wang | G06F 1/1681 16/354 |
| 2012/0042473 | A1* | 2/2012 | Wang | G06F 1/1681 16/319 |
| 2012/0192381 | A1* | 8/2012 | Zhang | G06F 1/1681 16/366 |
| 2013/0014346 | A1* | 1/2013 | Ahn | H04M 1/022 16/354 |
| 2013/0016489 | A1* | 1/2013 | Yeh | H04M 1/022 361/679.01 |
| 2013/0139355 | A1* | 6/2013 | Lee | H04M 1/022 16/354 |
| 2013/0152342 | A1* | 6/2013 | Ahn | F16C 11/04 16/354 |
| 2015/0267450 | A1* | 9/2015 | Chiang | G06F 1/1681 16/354 |
| 2015/0342068 | A1* | 11/2015 | Su | H04M 1/022 16/354 |
| 2016/0034004 | A1* | 2/2016 | Park | G06F 1/1681 16/366 |
| 2016/0048174 | A1* | 2/2016 | Hsu | G06F 1/1681 16/342 |
| 2016/0187934 | A1* | 6/2016 | Lee | G06F 1/1681 361/679.56 |
| 2017/0328102 | A1* | 11/2017 | Kato | E05D 11/1078 |
| 2019/0204878 | A1* | 7/2019 | Lin | E05D 11/082 |
| 2020/0081501 | A1* | 3/2020 | Lin | G06F 1/1681 16/366 |
| 2020/0257341 | A1* | 8/2020 | Lin | E05D 3/122 |
| 2021/0263565 | A1* | 8/2021 | Yen | G06F 1/1652 |
| 2022/0100238 | A1* | 3/2022 | Siddiqui | G06F 1/1641 |

\* cited by examiner

SINGLE-AXIS HINGE

FIELD OF THE INVENTION

The invention relates to a single-axis hinge, and more particularly to a hinge structure capable of stably maintaining a supporting angle formed by a support stand.

BACKGROUND OF THE INVENTION

When a laptop is used for a long time or executes multiple applications at the same time, due to its small size and is placed flat on a desktop when being used, it is easy to overheat due to poor heat dissipation, resulting in crashes and other problems. In order to help the laptop to dissipate heat, there are products such as a cooling pad made with heat-conducting or heat-dissipating material or a cooling stand equipped with a fan, which can be placed under the laptop to assist in heat dissipation. However, the size of the cooling stand or cooling pad is large, and it is inconvenient to bring it along for use outside. Also, a cooling rod with a smaller size is available on the market, which can be placed under the back of a laptop base, so that the back of the base can be raised to enable hot air from the bottom of the laptop to be quickly exhausted, and it is more convenient to carry than cooling stand or cooling pad. However, no matter what type of auxiliary cooling product, it needs to be purchased separately and has a certain volume, and also has the problem of inconvenience to carry. In addition, the pivot generally used for flip-top electronic products such as the laptop is installed between a screen and a base to support the screen to be opened or closed relative to the base. The pivot is usually combined with the electronic product and installed in a position that is not exposed outside, but when the common pivot is rotated, the base of the laptop cannot be raised to dissipate heat. Therefore, a structure combining a hinge with a support stand is introduced in the industry, and the support stand can lift the bottom of the laptop to form a supporting angle with a desktop through linkage of the hinge in order to dissipate heat from the laptop. One of the existing hinge structures that drives the support stand mostly uses gears or connecting rods to link with the pivot shaft to lift the support stand. If gears are used in linkage, linkage movement will continue and cannot be stopped, the gears must be disengaged from an engaged state in order to stop, but this will cause the lifting height of the support stand to be unstable. In another type of the existing hinge structures, the spur gear is driven to move the support stand through the commonly known special-shaped gear, but when the special-shaped gear that meshes with the spur gear is disengaged and impacted by an external force, an angle of the linkage member linked by the special-shaped gear or the hinge structure will change. Once meshing between the special-shaped gear and the spur gear is disengaged, changes in angle of the linkage member of the special-shaped gear cannot be stably controlled, resulting in an unstable supporting angle of the support stand.

SUMMARY OF THE INVENTION

A main object of the invention is to solve the problem that a support stand is incapable of stably maintaining a fixed angle and height after being linked and driven by a gear.

In order to achieve the above object, the invention provides a single-axis hinge. The single-axis hinge comprises a base, a movable plate, a limiting block, a rotating shaft and a stand set, wherein the base has a first shaft mounting hole, a stand drive shaft mounting hole disposed side by side with the first shaft mounting hole, and a path located between the first shaft mounting hole and the stand drive shaft mounting hole; the movable plate is formed with a second shaft mounting hole and a limiting notch communicating with the second shaft mounting hole; the limiting block is installed in the path and capable of moving in the path by force; the rotating shaft passes through the first shaft mounting hole and the second shaft mounting hole, the rotating shaft is provided with a driving block and a first cam disposed corresponding to the limiting block to push the limiting block when the rotating shaft rotates, an edge of the driving block is formed with a protruding portion inserted into the limiting notch and a transmission teeth portion that is not disposed around the edge of the driving block; the stand set comprises a stand drive shaft disposed in the stand drive shaft mounting hole and linked with the rotating shaft, and a support stand driven by the stand drive shaft to form a supporting angle relative to the base, the stand drive shaft has a gear meshing with the transmission teeth portion and a second cam disposed corresponding to the limiting block, the second cam is formed with a positioning notch into which the limiting block can be stuck when being pushed by the first cam, when the limiting block is stuck in the positioning notch, the stand drive shaft is restricted from rotating.

In one embodiment, a restricting block is formed on an edge of the base adjacent to one side of the stand drive shaft mounting hole.

In one embodiment, the single-axis hinge comprises an auxiliary bracket fixed on the base and supports the stand drive shaft and the rotating shaft.

In one embodiment, the auxiliary bracket comprises two through holes for respectively providing the rotating shaft and the stand drive shaft to pass through.

In one embodiment, the first cam has a first wheel center, a surface of the first cam is divided into a first working section and a second working section connected to the first working section, a first distance is defined from the first working section to the first wheel center is, and a second distance is defined from the second working section to the first wheel center, and the second distance less than the first distance.

In one embodiment, the second cam comprises a second wheel center, a surface of the second cam is divided into a third working section and a fourth working section connected to the third working section, a third distance is defined from the third working section to the second wheel center, a fourth distance is defined from the fourth working section to the second wheel center, and the fourth distance less than the third distance, and the positioning notch is located at the third working section.

In one embodiment, the single-axis hinge comprises a plurality of torsion plates disposed in a stack, each of the torsion plates has a first opening for clamping the rotating shaft, and a second opening for clamping the stand drive shaft.

In one embodiment, the single-axis hinge comprises a torsion set disposed on the rotating shaft.

According to the foregoing disclosure, compared with the prior art, the invention has the following characteristics: the invention mainly uses a driving mechanism between the first cam, the second cam and the limiting block to restrict the driving block from continuously driving the gear, so that the stand drive shaft is jointly restricted from rotating, and the support stand is capable of stably forming the supporting angle relative to the base, which is different from the prior art only relying on the gear to link with and to drive the support stand to be fixed at a specific angle.

DETAILED DESCRIPTION OF THE PREFERRED EMBODIMENTS

The detailed description and technical content of the invention are described below with reference to the accompanying drawings.

Figure 1:
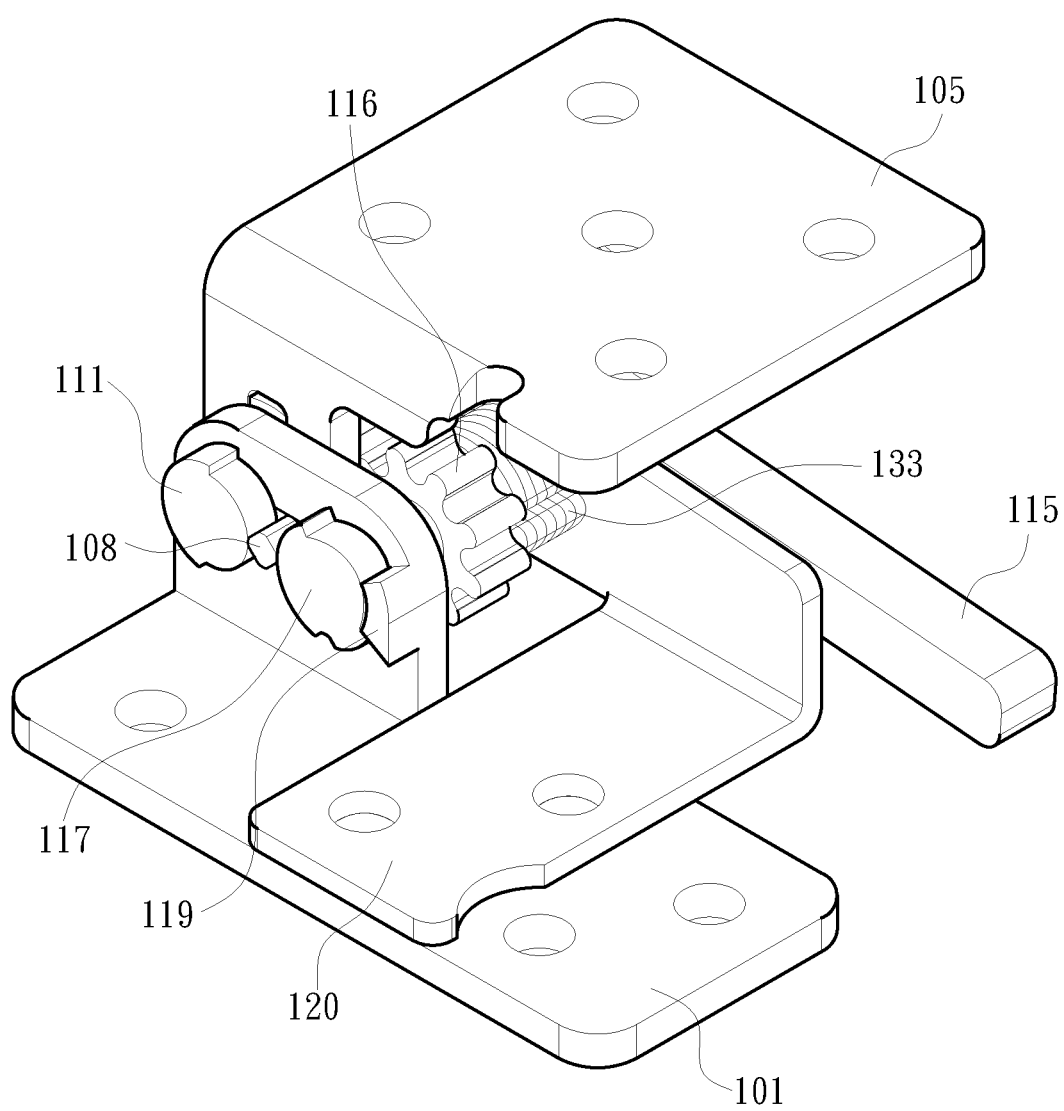
FIG. 1 is a perspective assembly view of the invention viewed from an angle.
Figure 2:
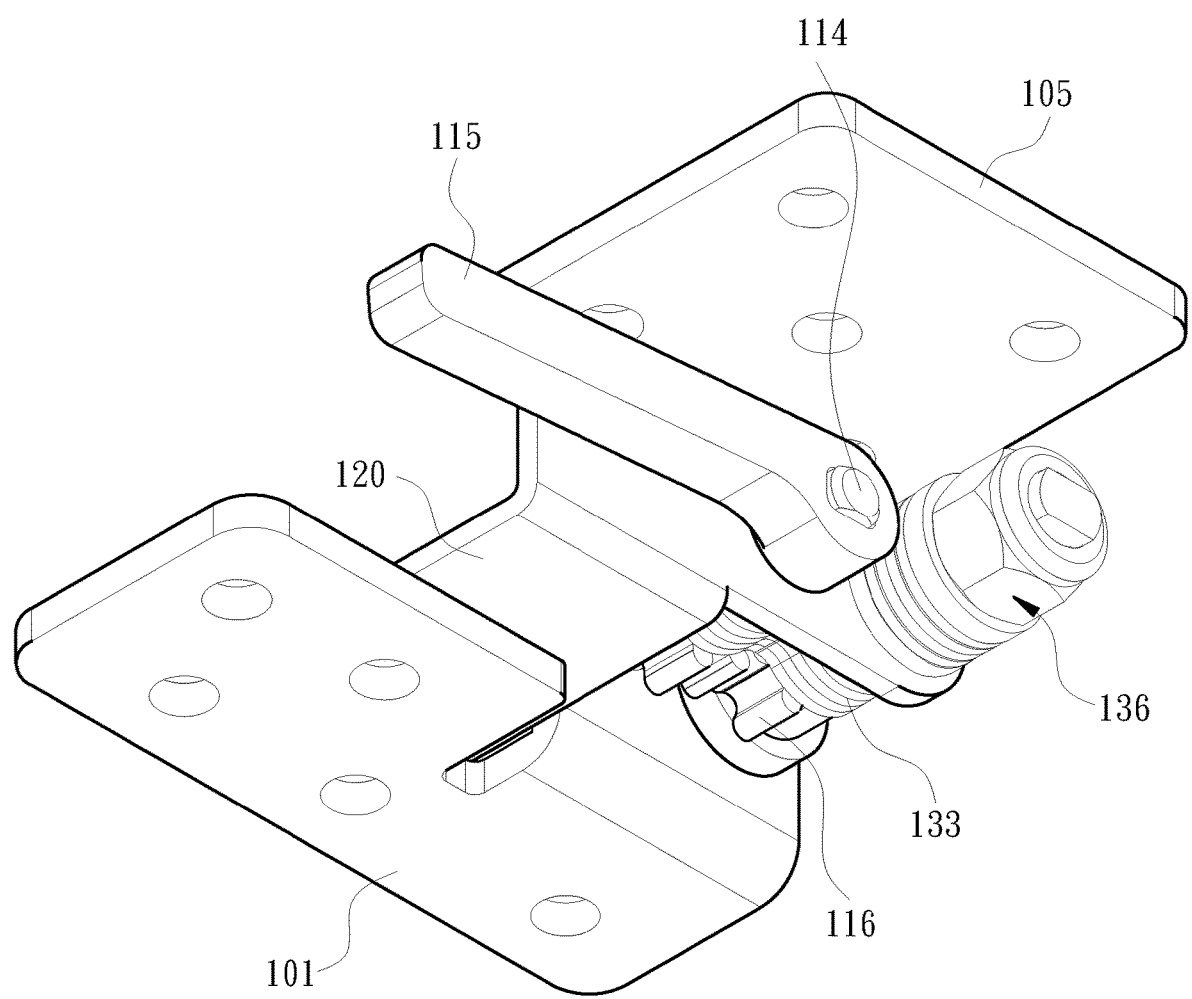
FIG. 2 is a perspective assembly view of the invention viewed from another angle.
Figure 3:
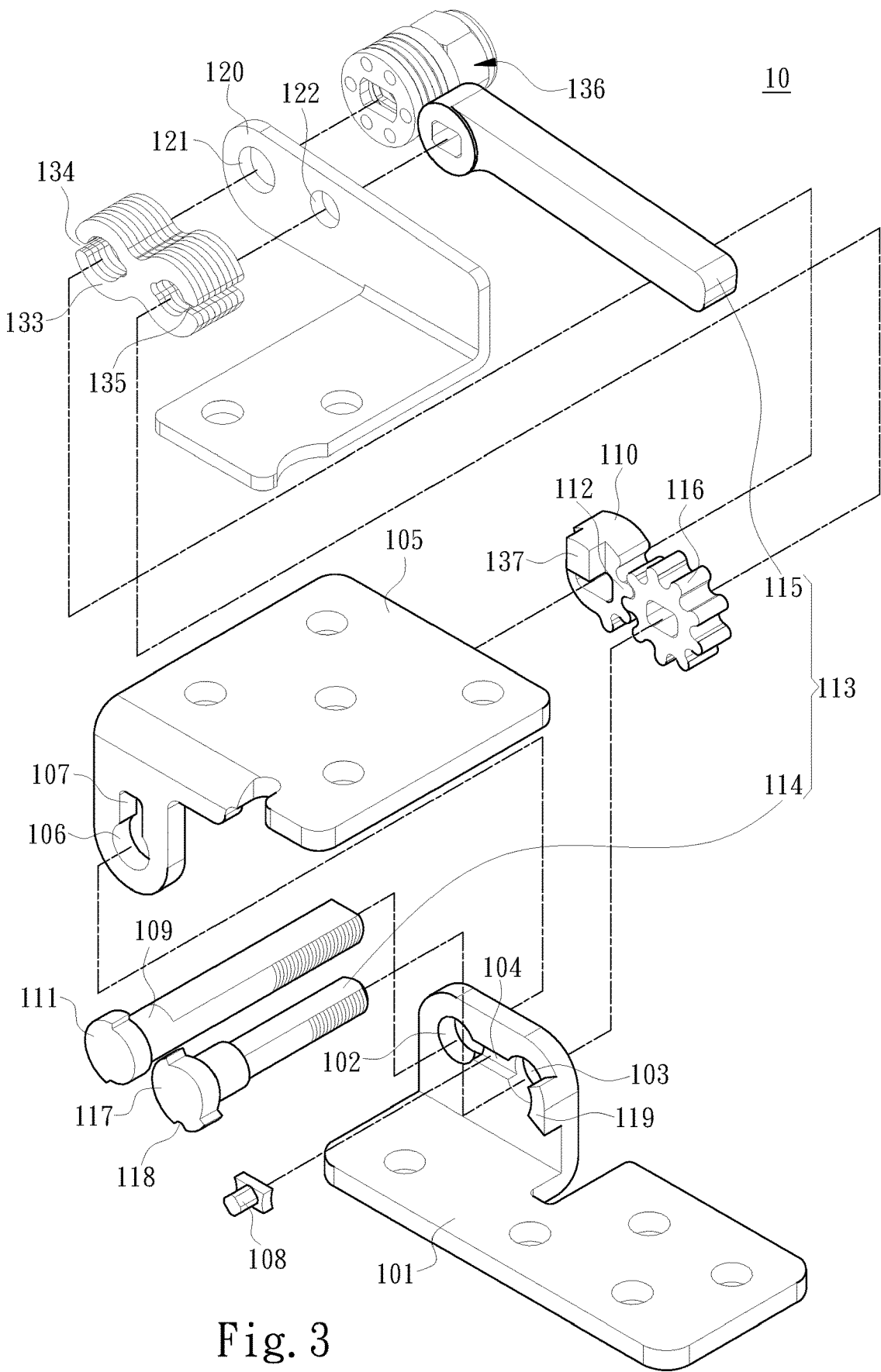
FIG. 3 is a perspective exploded view of components of the invention.

Please refer to FIG. 1, FIG. 2 and FIG. 3, the invention provides a single-axis hinge 10, the single-axis hinge 10 comprises a base 101, a movable plate 105, a limiting block 108, a rotating shaft 109 and a stand set 113. Specifically, the base 101 can be assembled with a bottom of an external electronic device (not shown in the figures), such as a bottom of a laptop. The base 101 comprises a first shaft mounting hole 102, a stand drive shaft mounting hole 103 disposed side by side with the first shaft mounting hole 102, and a path 104 located between the first shaft mounting hole 102 and the stand drive shaft mounting hole 103. In one embodiment, a restricting block 119 is formed on an edge of the base 101 adjacent to one side of the stand drive shaft mounting hole 103. The movable plate 105 can be assembled with a screen of a laptop, so that the base 101 and the movable plate 105 can rotate relative to each other. The movable plate 105 is formed with a second shaft mounting hole 106 and a limiting notch 107 communicating with the second shaft mounting hole 106. The limiting block 108 is installed in the path 104 and capable of sliding back and forth in the path 104 when being pushed. The rotating shaft 109 passes through the first shaft mounting hole 102 and the second shaft mounting hole 106 in sequence. The rotating shaft 109 is provided with a driving block 110 and a first cam 111 disposed corresponding to the limiting block 108. When the rotating shaft 109 rotates, the first cam 111 pushes the limiting block 108. An edge of the driving block 110 is formed with a protruding portion 137 inserted into the limiting notch 107 and a transmission teeth portion 112 that is not completely surround the edge of the driving block 110. Specifically, the transmission teeth portion 112 is only formed on a part of the edge of the driving block 110, unlike a common spur gear with continuous and uninterrupted gear teeth formed around an edge. The stand set 113 comprises a stand drive shaft 114 disposed in the stand drive shaft mounting hole 103 and linked with the rotating shaft 109, and a support stand 115 driven by the stand drive shaft 114 to form a supporting angle relative to the base 101. The stand drive shaft 114 comprises a gear 116 that meshes with the transmission teeth portion 112 and a second cam 117 disposed corresponding to the limiting block 108. The second cam 117 is formed with a positioning notch 118 which is provided for the limiting block 108 being stuck thereinto when being pushed by the first cam 111, and the stand drive shaft 114 is restricted from rotating while the limiting block 108 is stuck in the positioning notch 118. Please refer to FIG. 3, in one embodiment, the single-axis hinge 10 comprises an auxiliary bracket 120 fixed on the base 101 to support the stand drive shaft 114 and the rotating shaft 109, and the auxiliary bracket 120 comprises two through holes 121, 122 for respectively providing the rotating shaft 109 and the stand drive shaft 114 to pass through.

Figure 4:
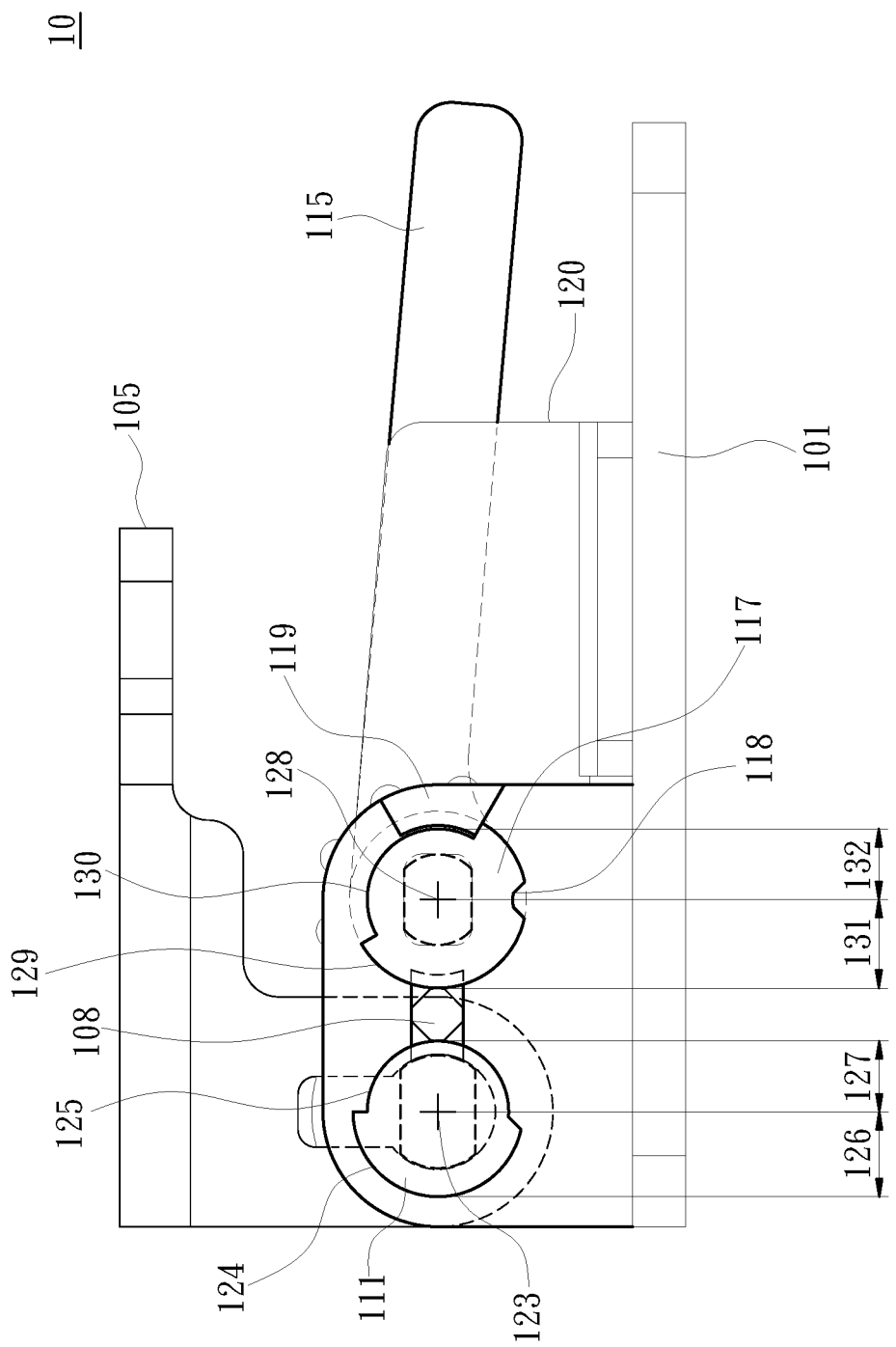
FIG. 4 is a first actuation schematic diagram of the invention.
Figure 5:
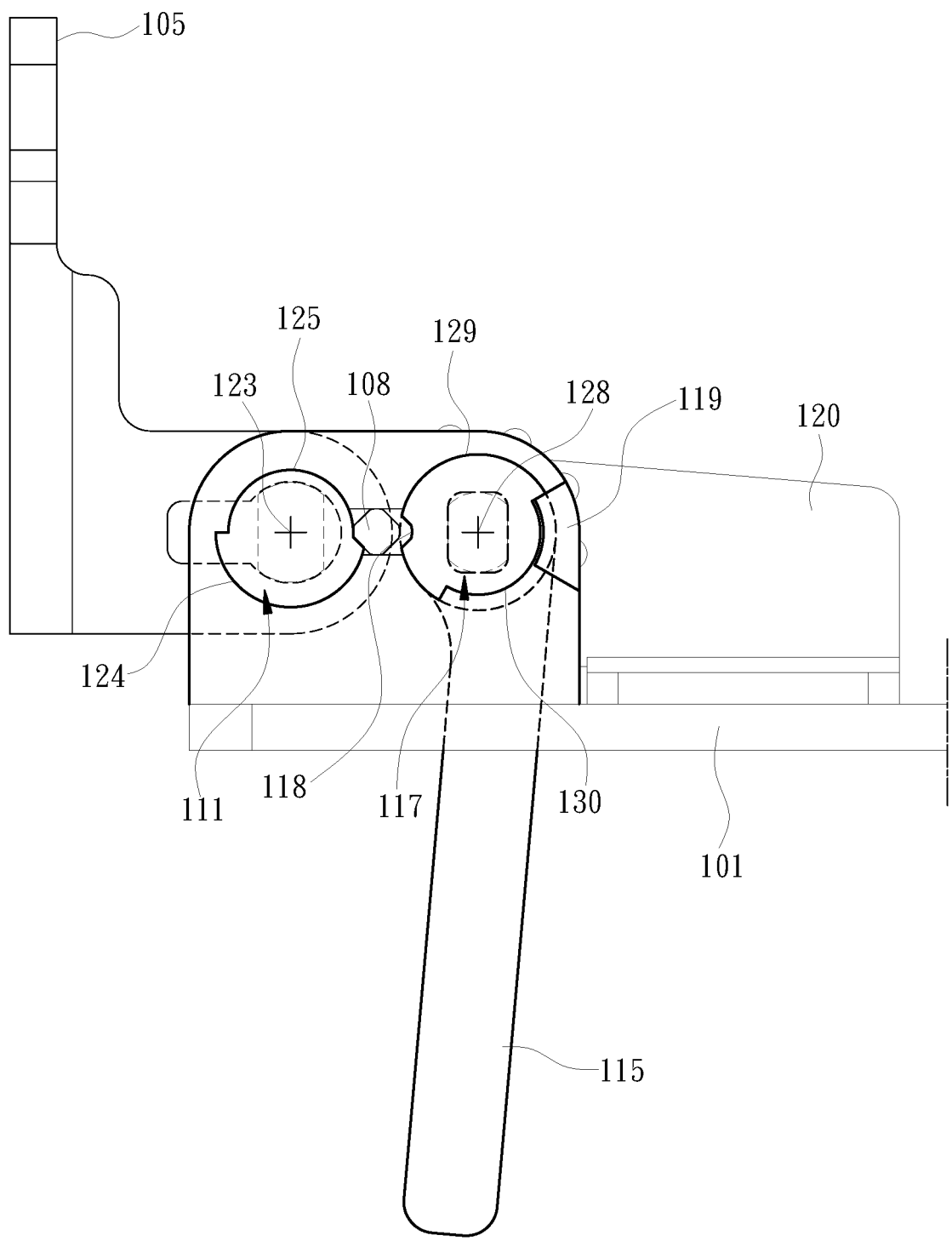
FIG. 5 is a second actuation schematic diagram of the invention.
Figure 6:
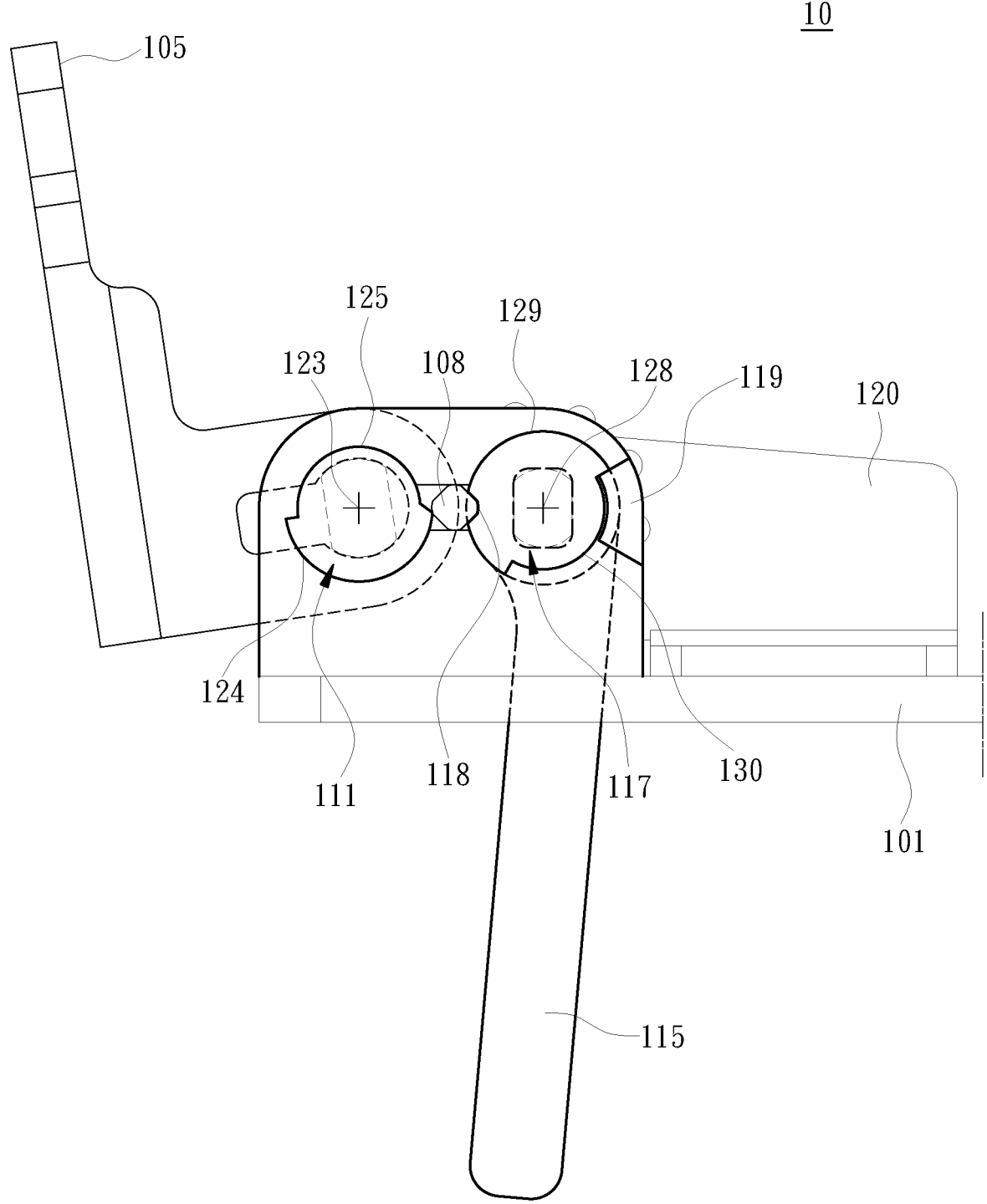
FIG. 6 is a third actuation schematic diagram of the invention.
Figure 7:
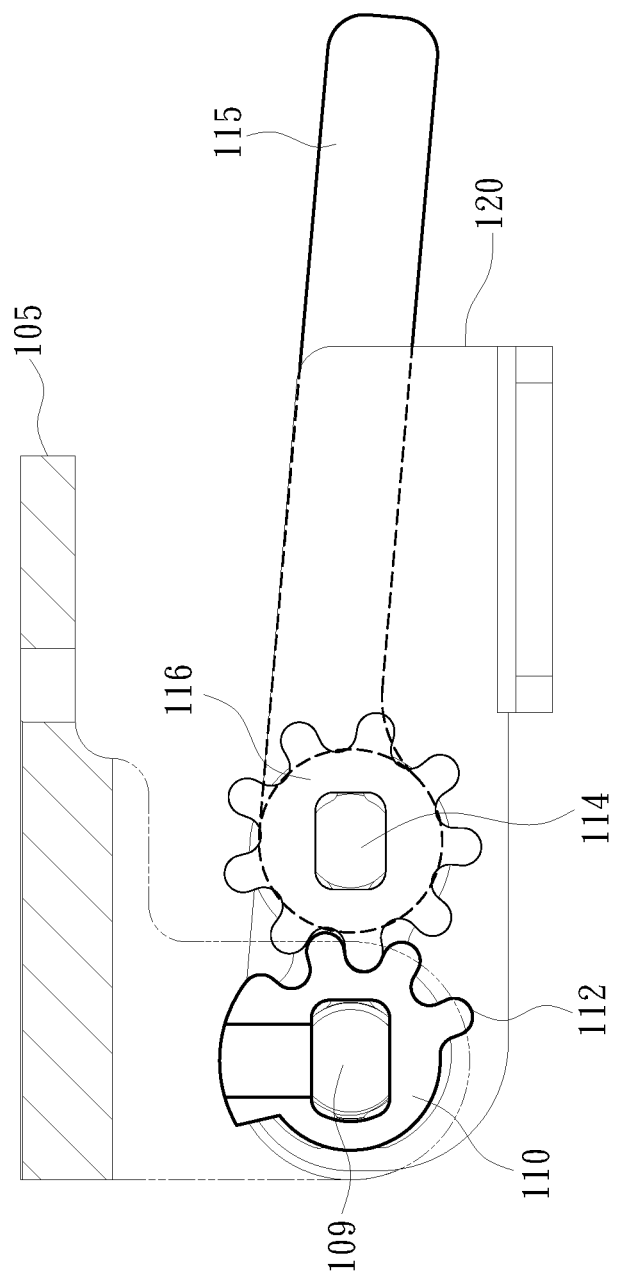
FIG. 7 is a fourth actuation schematic diagram of the invention.
Figure 8:
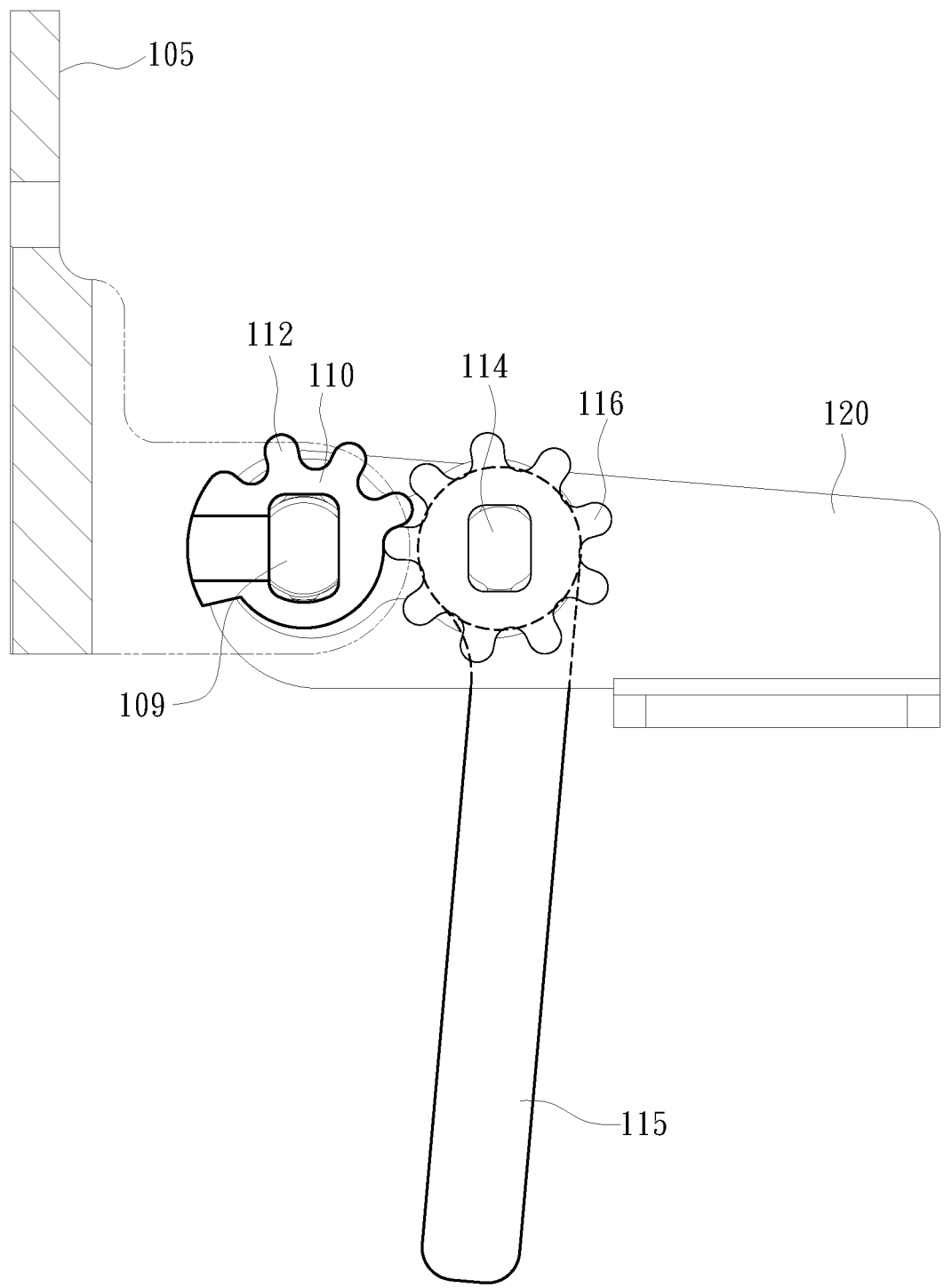
FIG. 8 is a fifth actuation schematic diagram of the invention.

Please refer to FIG. 4, in one embodiment, the first cam 111 comprises a first wheel center 123, a surface of the first cam 111 is divided into a first working section 124 and a second working section 125 connected to the first working section 124, a first distance 126 is defined from the first working section 124 to the first wheel center 123, a second distance 127 is defined from the second working section 125 to the first wheel center 123, and the second distance 127 is less than the first distance 126. The second cam 117 comprises a second wheel center 128, a surface of the second cam 117 is divided into a third working section 129 and a fourth working section 130 connected to the third working section 129, a third distance 131 is defined from the third working section 129 to the second wheel center 128, a fourth distance 132 is defined from the fourth working section 130 to the second wheel center 128, and the fourth distance 132 is less than the third distance 131, and the positioning notch 118 is located at the third working section 129.

Actuating process of the first cam 111, the second cam 117 and the limiting block 108 is described in detail below.

Please refer to FIG. 1, FIG. 2, FIG. 3, FIG. 4, FIG. 5 and FIG. 6, the first cam 111 comprises the first working section 124 and the second working section 125, and the first distance 126 is greater than the second distance 127, so it can be known that there is a drop between the first working section 124 and the second working section 125. The second cam 117 comprises the third working section 129 and the fourth working section 130, and the third distance 131 is greater than the fourth distance 132, so it can be known that there is a drop between the third working section 129 and the fourth working section 130. An initial state of implementation of the single-axis hinge 10 of the invention is that the movable plate 105 is parallel to the base 101. When the movable plate 105 rotates in a counterclockwise direction, the rotating shaft 109 is driven by the movable plate 105 to rotate in a counterclockwise direction. At this time, the second working section 125 of the first cam 111 abuts against the limiting block 108 to rotate. After the first cam 111 continues to rotate, the limiting block 108 abuts against the first working section 124 from the second working section 125, so as to be pushed to be displaced. When the movable plate 105 rotates in a counterclockwise direction, the second cam 117 is driven by the rotating shaft 109 to rotate clockwise, so that the first cam 111 and the second cam 117 rotate simultaneously, and the third working section 129 of the second cam 117 rotates clockwise while abutting against the limiting block 108. The limiting block 108 is pushed by the first working section 124 of the first cam 111 to generate displacement and to be stuck in the positioning notch 118 located in the third working section 129, and the second cam 117 is also restricted by the restricting block 119, so that the stand drive shaft 114 is restricted from rotating, and thus the support stand 115 is capable of rotating to a set angle and maintaining stability.

Then, an actuation of the driving block 110 and the gear 116 is explained in detail below when the invention is implemented.

Please refer to FIG. 1, FIG. 2, FIG. 3, FIG. 4, FIG. 5, FIG. 6, FIG. 7 and FIG. 8, the following description takes an implementation of the invention in a laptop as an example. When the single-axis hinge 10 of the invention is implemented, the base 101 is assembled with a lower half of the laptop (i.e., a base where a keyboard is located), and the movable plate 105 is assembled with an upper half of the laptop (i.e., a screen). When the laptop is opened with the upper half rotating in a counterclockwise direction relative to the lower half, the upper half further drives the movable plate 105 to rotate. The limiting notch 107 formed on the movable plate 105 is further stuck with the protruding portion 137 of the driving block 110, and the limiting notch 107 and the protruding portion 137 are abutting against each other, when the movable plate 105 rotates, the driving block 110 is driven to rotate, and the rotating shaft 109 is driven to rotate to drive the gear 116 disposed on the stand drive shaft 114 to rotate while the driving block 110 rotating, the stand drive shaft 114 rotates at the time that the gear 116 is rotating, and the support stand 115 is driven to rotate when the stand drive shaft 114 rotates. Furthermore, the transmission teeth portion 112 of the driving block 110 is only formed around a part of an outer edge of the driving block 110, the transmission teeth portion 112 will disengage from the gear 116 after the driving block 110 rotates in a counterclockwise direction, and the transmission teeth portion 112 stops driving the gear 116 to rotate, and the stand drive shaft 114 is incapable of being driven by the rotating shaft 109 to rotate. Moreover, under continuous rotation of the rotating shaft 109 by force, the limiting block 108 is pushed by the first cam 111 to displace until the limiting block 108 is stuck in the positioning notch 118 of the second cam 117, thereby the support stand 115 is maintained at the set angle after rotating to support a bottom of the laptop to facilitate cooling.

Please refer to FIG. 3 again. In one embodiment, the single-axis hinge 10 comprises a plurality of torsion plates 133 disposed in a stack, each of the plurality of torsion plates 133 comprises a first opening 134 for clamping the rotating shaft 109, and a second opening 135 for clamping the stand drive shaft 114. In one embodiment, the single-axis hinge 10 comprises a torsion set 136 disposed on the rotating shaft 109, and the torsion set 136 is composed of a plurality of torsion leaf springs, a friction plate, a plurality of leaf springs and a wear-resistant plate (this belongs to the scope of the conventional technology and will not be described in detail herein).

What is claimed is:

1. A single-axis hinge comprising:
    a base comprising a first shaft mounting hole, a stand drive shaft mounting hole disposed side by side with the first shaft mounting hole, and a path located between the first shaft mounting hole and the stand drive shaft mounting hole;
    a movable plate formed with a second shaft mounting hole and a limiting notch communicating with the second shaft mounting hole;
    a limiting block installed in the path and capable of moving in the path when being pushed;
    a rotating shaft passing through the first shaft mounting hole and the second shaft mounting hole, the rotating shaft being provided with a driving block and a first cam disposed corresponding to the limiting block to push the limiting block when the rotating shaft rotating, an edge of the driving block being formed with a protruding portion inserted into the limiting notch and a transmission teeth portion which is not completely surround the edge; and
    a stand set comprising a stand drive shaft disposed in the stand drive shaft mounting hole and linked with the rotating shaft, and a support stand driven by the stand drive shaft to form a supporting angle relative to the base, the stand drive shaft comprising a gear meshing with the transmission teeth portion and a second cam disposed corresponding to the limiting block, the second cam being formed with a positioning notch into which the limiting block being stuck when being pushed by the first cam, when the limiting block being stuck in the positioning notch, the stand drive shaft being restricted from rotating.

2. The single-axis hinge as claimed in claim 1, wherein a restricting block is formed on an edge of the base adjacent to one side of the stand drive shaft mounting hole.

3. The single-axis hinge as claimed in claim 1, wherein the single-axis hinge comprises an auxiliary bracket fixed on the base and supporting the stand drive shaft and the rotating shaft.

4. The single-axis hinge as claimed in claim 3, wherein the auxiliary bracket comprises two through holes for respectively providing the rotating shaft and the stand drive shaft to pass through.

5. The single-axis hinge as claimed in claim 1, wherein the first cam comprises a first wheel center, a surface of the first cam is divided into a first working section and a second working section connected to the first working section, a first distance is defined from the first working section to the first wheel center, a second distance is defined from the second working section to the first wheel center, and the second distance is less than the first distance.

6. The single-axis hinge as claimed in claim 5, wherein the second cam comprises a second wheel center, a surface of the second cam is divided into a third working section and a fourth working section connected to the third working section, a third distance is defined from the third working section to the second wheel center, a fourth distance is defined from the fourth working section to the second wheel center, the fourth distance is less than the third distance, and the positioning notch is located at the third working section.

7. The single-axis hinge as claimed in claim 1, wherein the single-axis hinge comprises a plurality of torsion plates disposed in a stack, each of the plurality of torsion plates comprises a first opening for clamping the rotating shaft, and a second opening for clamping the stand drive shaft.

8. The single-axis hinge as claimed in claim 7, wherein the single-axis hinge comprises a torsion set disposed on the rotating shaft.

9. The single-axis hinge as claimed in claim 1, wherein the single-axis hinge comprises a torsion set disposed on the rotating shaft.

\* \* \* \* \*